July 5, 1932. D. GÁBOR 1,865,752
VACUUM TUBE
Filed Feb. 28, 1931

Inventor:
Dionys Gábor.

Patented July 5, 1932

1,865,752

UNITED STATES PATENT OFFICE

DIONYS GÁBOR, OF BERLIN-WILMERSDORF, GERMANY, ASSIGNOR TO SIEMENS & HALSKE, AKTIENGESELLSCHAFT, OF SIEMENSSTADT, NEAR BERLIN, GERMANY, A CORPORATION OF GERMANY

VACUUM TUBE

Application filed February 28, 1931, Serial No. 518,936, and in Germany February 3, 1930.

My invention relates to vacuum tubes, and more particularly to the vacuum-tight sealing of electrodes and terminal conductors or leading-in members in quartz glass vacuum or electron tubes and the like.

The extremely low coefficient of thermal expansion of fused quartz renders the vacuum-tight sealing in of metallic terminal and leading-in members, in the manner customary in glass vessels, extremely difficult. No metal is known which possesses a sufficiently low thermal expansion up to the very high fusion temperature of the quartz. When sealing tungsten wires in quartz a considerable gap is produced between the two materials. Other metals of high fusing points, such as molybdenum, tantalum, iridium, adhere to the fused quartz and fracture it on cooling due to tensile stresses set up therein.

According to my invention a tight seal between the quartz and the metal can be obtained if care is taken to permit compressive forces only or very small tensile forces at the place where the quartz and the metal are in contact. This result is obtained by filling a suitably shaped opening in the quartz vessel with metals which on solidifying do not contract but expand.

There are three metallic elements known which have this property of expanding on solidifying, viz.: antimony, bismuth, and gallium. Gallium is not very suitable for the object in view due to its low fusion point (30° C.). Antimony is not entirely satisfactory since its fusion point is rather high (630° C.). The most suitable metal is bismuth. It fuses or melts at 270° C. and possesses a comparatively low coefficient of thermal expansion.

The dilation of bismuth on solidifying amounts to 3.3 per cent. It would thus appear that in the absence of provisions to avoid the full effect of the expansion of bismuth on solidification the quartz would be fractured under the action of this enormous expansion of the bismuth, like an iron bomb in which water is allowed to freeze. Of this dilation, only less than one-third, about 0.9 per cent, can be utilized, if no tensile stresses are to be allowed to develop at the quartz-bismuth boundary when cooling down to room temperature, because this is just the amount of contraction of the solidified bismuth in cooling from its fusion point to room temperature. However, it is not to be expected that quartz would withstand even the stresses reduced to the minimum mentioned above, because the known elasticity of bismuth at room temperature, and the tensile strength of quartz of about 6 to 7 kilograms per millimeter must be taken into account, and, therefore, a fracturing of the quartz is likely to occur even in the theoretically most favorable case, namely, in a case in which a spherical drop of bismuth is disposed in a sphere of quartz of infinitely great wall thickness.

On the other hand, tests have proven that suitably shaped cavities in quartz could be filled with fused bismuth, making a perfectly tight seal without fracturing the quartz.

The explanation for this fact is traceable to the particularly poor heat conductivity of the bismuth. The outer layers of bismuth in contact with the quartz solidify first and, while the interior mass solidifies gradually and expands in doing so. The pressure of the inner layers is thus partly sustained by the outer layers of bismuth and is only partly transmitted to the surrounding wall of quartz. In other words, the coefficient of dilation becomes apparently less provided the cooling is sufficiently rapid. The fact that the cooling can take place with sufficient rapidity in spite of the poor heat conductivity of the quartz wall can thus be explained by the poor heat conductivity of the bismuth.

The manner in which my invention may be utilized in practice is illustrated in the accompanying drawing. In this drawing.

Figure 1:
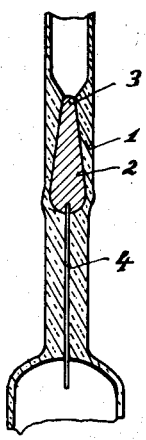
Figure 1 is a longitudinal section through the leading-in arrangement of a vacuum tube.
Figure 3:
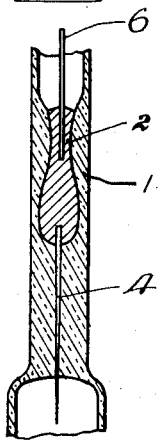
Figure 3 illustrates a modified leading-in arrangement in longitudinal section.

Referring now to the drawing, 1 is the quartz body having a cavity into which the pure metallic bismuth 2 free from oxide is poured. Experiments have shown that this cavity should have preferably the shape of a bulb with a long, slightly tapering conical neck 3 extending towards the outside such as is indicated in Fig. 1. Towards the other side, the metal 2 is connected with the internal electrodes by means of a tungsten wire 4 which is fused into the quartz or which may be accurately fitted therein, for example by employing for the fitting action of a tapering pin or wire consisting of invar or any other desired and suitable metal turning this wire, and applying a grinding substance until a channel is obtained corresponding in shape to the shape of the pin or wire. The fit of the wire or pin should be tight enough so that the capillary gap or interstice does not permit the metal to advance through the channel in which the wire is fitted. The fit may, for instance, be produced in such a way that a tungsten wire of accurately straight cylindrical or slightly tapering shape such as shown at 4 in Figure 3, is fused into the quartz. The adherence of quartz to tungsten is practically negligible, and accordingly the wire may subsequently be withdrawn and a wire of another metal as nearly as possible of the same shape and size may be inserted in its place prior to the pouring in of the bismuth seal. No scientific explanation can be furnished for the fact that quartz does not adhere to tungsten to any noticeable degree, but the existence of this phenomenon is evidenced by the many tungsten-quartz products which can only be explained by the practical non-adherence of quartz to tungsten.

The pouring in of the bismuth or other suitable metal or alloy is preferably accomplished under a vacuum. The manner of cooling down is decisive for the tightness of the joint obtained. If the metal in the bulb shaped cavity, receptacle, or container is allowed to solidify first, the vessel is fractured when the last portion of the fused metal solidifies. If, on the other hand, the metal is allowed to solidify slowly and gradually from the bottom towards the top, the quartz remains intact, but on cooling, a gap will form between quartz and metal. If, finally, the entire mass of metal is allowed to solidify together by preheating it well and permitting it to cool while in contact with the air, a perfectly tight seal can be obtained.

Figure 2:
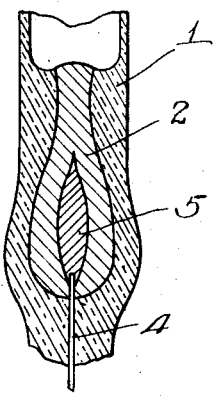
Figure 2 shows the seal on a larger scale, in longitudinal section.

The explanation of this fact will be understood by reference to Figure 2 of the drawing. This figure, it will be recalled, shows an enlarged view of the seal. The metal 2 cools down from the outside towards the inside, until only a very minute portion 5 of liquid metal remains enveloped in the solidified outer shell or layer 2. When this portion 5 solidifies it sets the whole under the requisite pressure.

In other respects the procedure must adapt itself to the shape of the container for the metal and to the thickness of the quartz wall and must be determined by preliminary tests in each individual case in accordance with the above directions and in accordance with the principles which I have above explained.

Even in the event that the seal which is obtained by following the above directions is not absolutely tight, the application of my invention affords a considerable advantage. It is possible in such a case to fill up the joint with sealing wax, or a suitable cementing substance, such for example as is obtained as a by-product of rubber manufacture. Such substances, which may be compared in some respects to sealing wax, are well known and widely used in industry. They are brittle below temperatures of around 20° centigrade, putty-like around 50–60° centigrade, and they melt around 80° centigrade. However, I have found in numerous experiments that the gap was invariably so extremely minute that none of these stopping means were able to enter.

The terminal arrangement for the leading out of the current is preferably provided by inserting a galvanized hot metal wire, such as the wire 6 into the neck of the metal 2, as is shown in Figure 3 of the drawing. This is particularly easy in the case of bismuth because bismuth forms a freely flowing alloy with tin. It is not advisable to pass the tungsten wire 4 through to the outside, on the one hand because the tungsten wire almost always shows capillary fissures, produced in the drawing process, along its surface in the longitudinal direction, and on the other hand for the reason that bismuth and antimony, should the latter metal be employed, do not closely cling to tungsten.

A further considerable improvement of my invention may be attained by employing an alloy of bismuth with less than one per cent of metallic calcium, instead of the pure bismuth. While pure bismuth does not adhere to quartz a trace of calcium suffices to bring about an extraordinary intimate adhesion of the metal to quartz so that at the boundary (metal-quartz) tensile stresses may be permitted. The alloy bismuth-calcium has, furthermore, a finer, denser crystalline grain or structure than the pure bismuth. The leading-in arrangement is able to withstand temperatures close up to the fusion point, and will thus be tight up to about 250° C.

When employing the bismuth seal or packing for quartz mercury vapor lamps the joints become automatically tighter in course of time due to the gradual amalgamation of the seal by mercury vapor penetrating from the lamp into the capillary gap. This process may be artificially accelerated and the application of my invention in this case constitutes a particularly advantageous embodiment.

My invention may be modified in various ways. Bismuth or antimony, or alloys of these and of other metals may be employed if desired. It is understood that any metal used is to be considered an equivalent of bismuth within the meaning of the following claims, provided, of course, that the metal or alloy meets the requirements of the principles and mode of operation presented in the foregoing specification. I have defined in the following claims what I consider new and what I desire to have protected by Letters Patent.

I claim as my invention:

1. In a quartz vessel of the class described, an internally disposed terminal seal, comprising a cavity in said vessel, a metal disposed in said cavity, said metal being subject to enlargement in volume on solidifying, and conductors attached to said metal.

2. A vacuum-tight electrode leading-in device for vacuum tubes having a vessel of fused quartz, comprising a cavity in said vessel, and a bismuth containing alloy disposed in said cavity, said alloy undergoing enlargement in volume on solidifying.

3. An internally disposed vacuum-tight electrode leading-in device for vacuum tubes having a quartz vessel, comprising a cavity in said vessel, a substance subject to enlargement in volume on solidifying disposed in said cavity, and conductors connected to said substance, said substance containing bismuth with an admixture of less than 1% calcium.

4. An internally disposed vacuum-tight electrode leading-in device for vacuum tubes having a quartz vessel, comprising a cavity in said vessel, an alloy subject to enlargement in volume on solidifying disposed in said cavity, and conductors connected to said alloy, said alloy containing an admixture of less than 1% calcium.

5. An internally disposed vacuum-tight electrode leading-in device for vacuum tubes having a quartz vessel, comprising a cavity in said vessel, a metal subject to enlargement in volume on solidifying disposed in said cavity, and conductors connected to said metal, said cavity being substantially bulb shaped.

In testimony whereof I affix my signature.

DIONYS GÁBOR.